Figure 1:
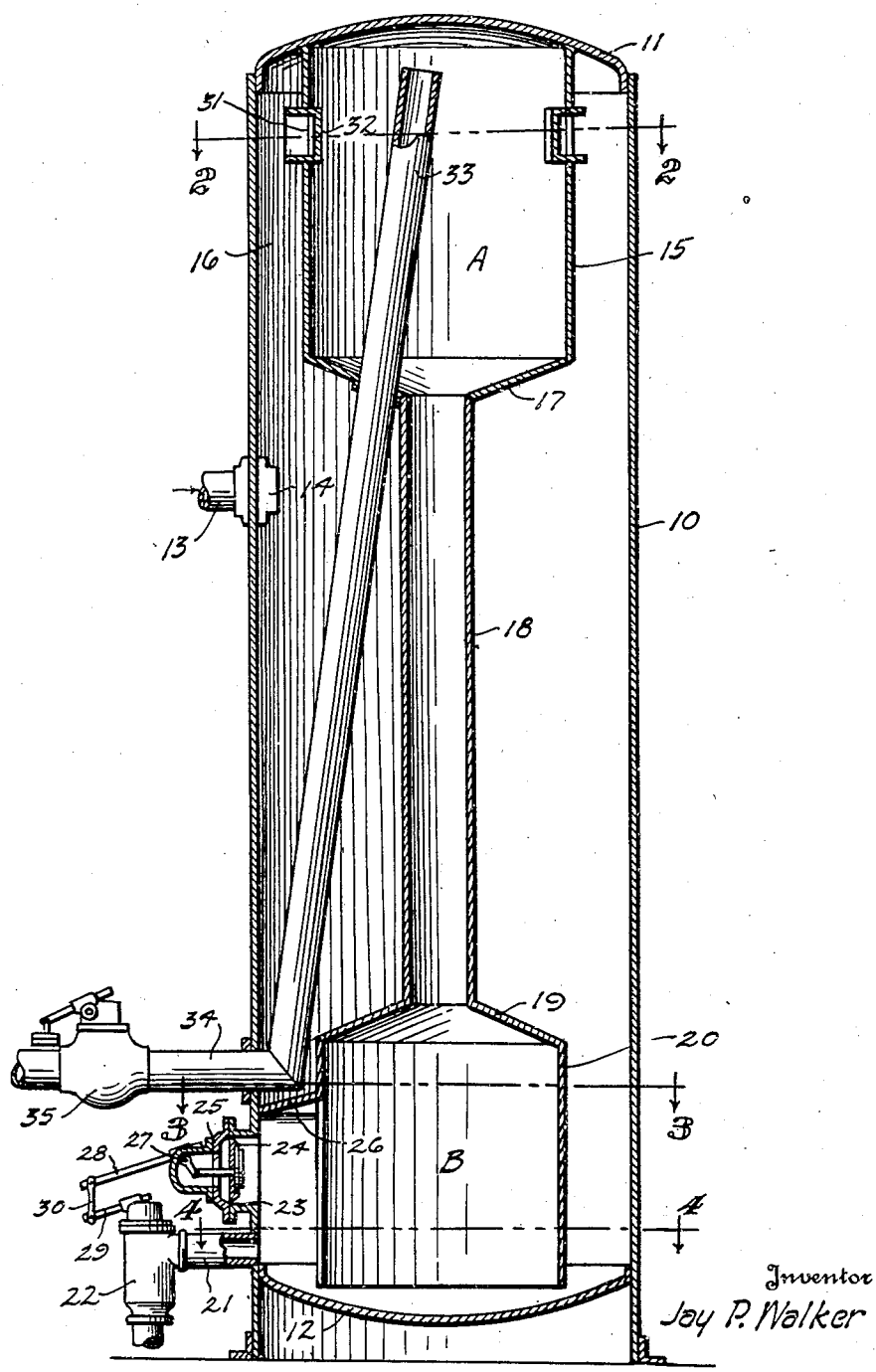

Aug. 22, 1933.    J. P. WALKER    1,923,599
SEPARATOR
Filed Aug. 31, 1931    3 Sheets-Sheet 1

Inventor
Jay P. Walker
By
Jack A. Ashley
Attorney

Aug. 22, 1933.　　　J. P. WALKER　　　1,923,599
SEPARATOR
Filed Aug. 31, 1931　　　3 Sheets-Sheet 2
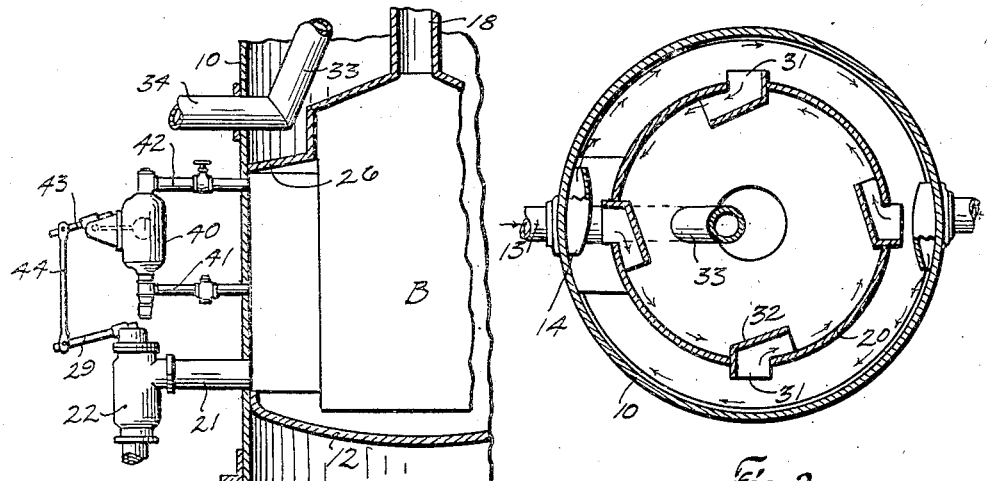
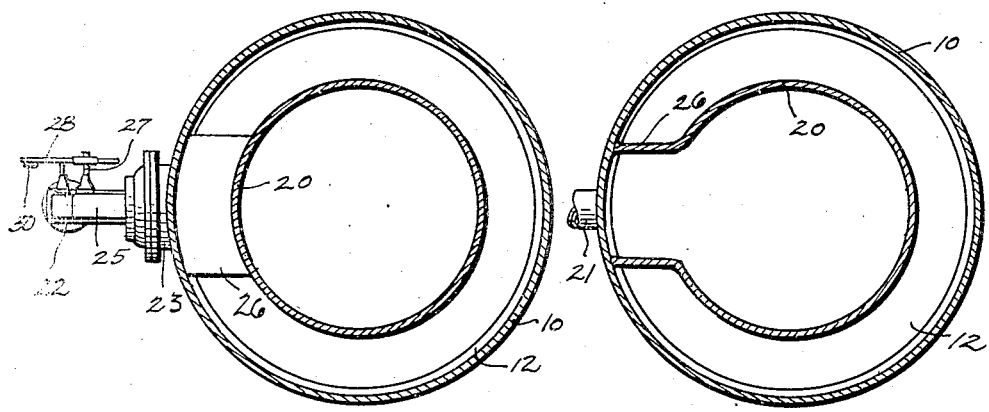
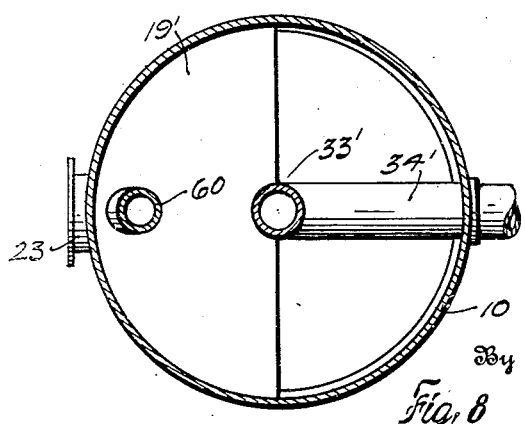
Inventor
Joy P. Walker
By
Jack A. Ashley
Attorney Aug. 22, 1933.   J. P. WALKER   1,923,599
SEPARATOR
Filed Aug. 31, 1931   3 Sheets-Sheet 3

Inventor
Jay P. Walker
By
Jack A. Ochley
Attorney

Patented Aug. 22, 1933

1,923,599

UNITED STATES PATENT OFFICE 1,923,599

SEPARATOR

Jay P. Walker, Tulsa, Okla.

Application August 31, 1931. Serial No. 560,327

7 Claims. (Cl. 183—2.7)

This invention relates to new and useful improvements in separators.

In the separation of oil and gas it is highly desirable to eliminate as much as possible the conveying of gas with the oil to the stock tanks, and also to prevent oil from blowing out of the gas risers with the gas. In carrying out a separation it is necessary to scrub the gaseous fluids so as to extract the entrapped oil therefrom, and this extracted oil must be drained from the baffles so as to take it out of the path of the gaseous fluids. Considerable difficulty is had where drain pipes are used and immersed in the oil chamber. Differences in pressures between various parts of the tank as well as differences in temperatures of the oil often cause the oil to be blown up through the drains into the path of the gaseous fluids, and thus carried out with the gas to the risers. Where the oil is exposed in the collecting chamber to the inflowing gas from the well, or is under considerable gas pressure, objectionable quantities of gas are likely to pass out with the oil to the stock tanks.

The invention has particularly to do with overcoming these objections and one object is to provide a method whereby the separated or collected oil, is discharged from one compartment or chamber, which is open to another compartment from which the gas (remaining after the scrubbing operation) is conducted from the tank, whereby the pressures in the two compartments or chambers are substantially equalized, thus preventing the oil from rising high enough in the drain between the two compartments to flow into the path of the gas.

A further object is to provide means for conveying or draining the extracted or baffled oil from the baffles or separating element down to an oil collecting compartment or chamber from which chamber the oil is conducted to the stock tanks, and particularly to make such means of sufficient size to permit gas to rise therethrough without forcing the oil upward therein.

A particular object of the invention is to provide a means and method of oil and gas separation, whereby a minimum gas pressure may be maintained in the separator tank; such a pressure being only sufficient to force the oil out through the pipe line to the stock tanks, and varying according to the size of pipe used.

A construction designed to carry out the invention will be hereinafter described together with other features of the invention.

Figure 6:
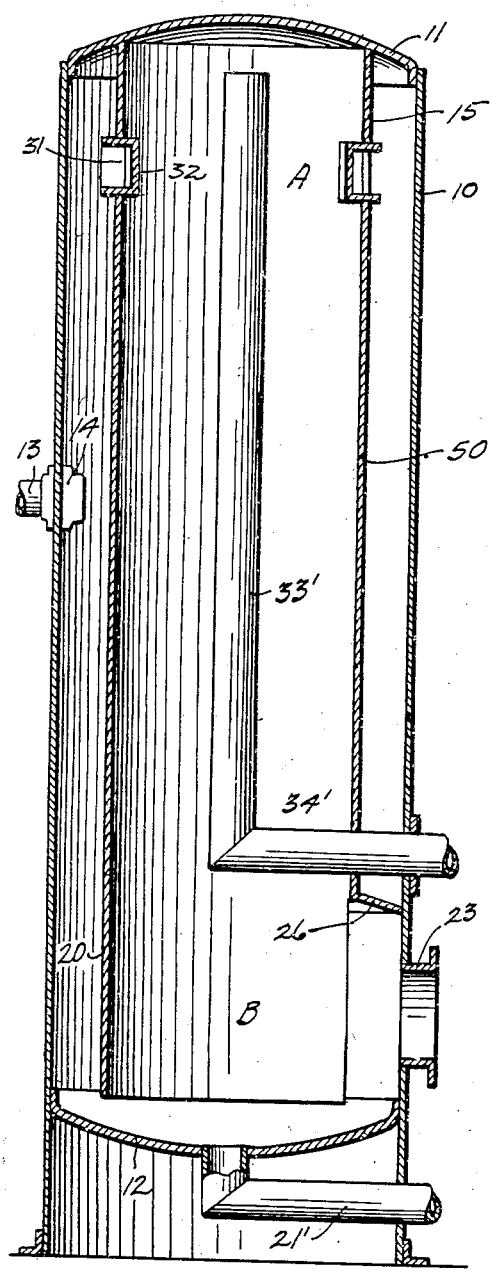
Figure 7:
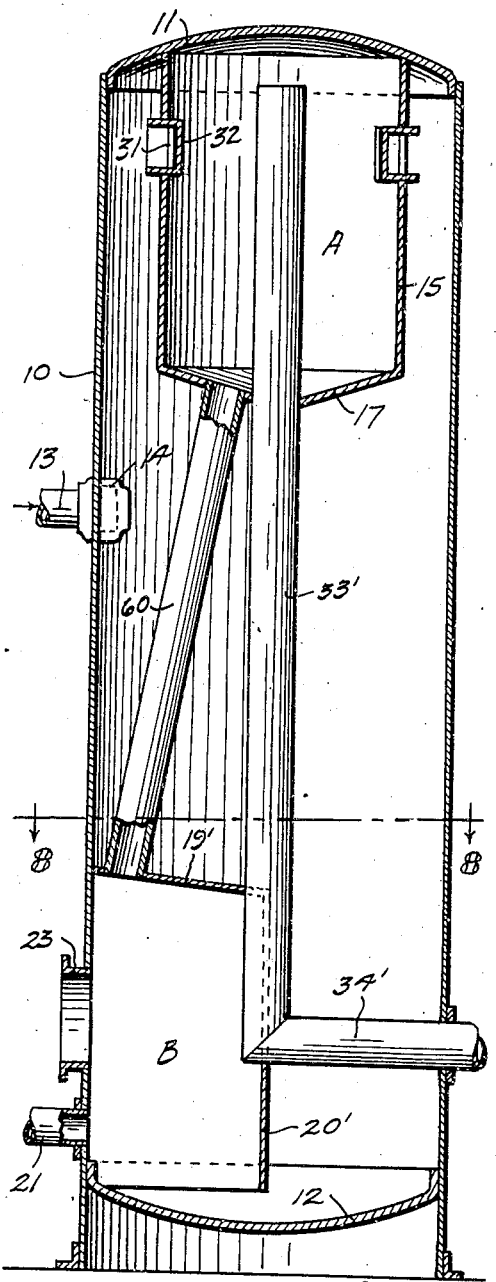

The invention will be more readily understood from a reading of the following specification and by reference to the accompanying drawings in which an example of the invention is shown, and wherein:

Figure 1 is a vertical sectional view of a separator constructed in accordance with the invention, Figure 2 is a horizontal cross-sectional view taken on the line 2—2 of Figure 1, Figure 3 is a horizontal cross-sectional view taken on the line 3—3 of Figure 1, Figure 4 is a horizontal cross-sectional view taken on the line 4—4 of Figure 1, Figure 5 is a vertical sectional view of a portion of the lower end of the tank showing a float control, Figures 6 and 7 are vertical sectional views of modified forms of the invention, and Figure 8 is a horizontal cross-sectional view taken on the line 8—8 of Figure 7.

In the drawings the numeral 10 designates an upright metal tank having a top 11 and a false bottom 12. An influent pipe 13 enters the tank at mid-height and discharges into a diverter 14 on the inner wall of the tank which diverter, as shown in Figures 1 and 2, is arranged to spread the influent on the inner wall of the tank and direct it circumferentially. This causes the oil and gas mixture to be spread in a thin film whereby the liquids take a downward helical course, and the gaseous fluids pursue an upward helical course.

A cylindrical baffle 15 is suspended from the top 11 concentrically within the tank and is considerably less in diameter so as to provide an annular scrubbing channel or passage 16 extending vertically between the wall of the baffle and the wall of the tank. The baffle is provided with a conical bottom 17 from which extends an axial tube 18. The tube extends downwardly in the tank 10 to the conical top 19 of a collecting compartment 20. It is pointed out that the baffle 15 forms an upper scrubbing chamber A while the compartment 20 forms a lower oil collecting chamber B. The compartment 20 is preferably cylindrical as is shown in Figures 3 and 4, and terminates close to but above the false bottom 12 so that oil flowing into the tank 10 must reach the lowest point therein before entering the compartment 20. This assures the reception of quiet oil in said compartment. The space within the tank between the chambers A and B forms a high pressure receiving chamber.

An oil outlet pipe 21 extends from the tank just over the bottom 12 and has mounted thereon a suitable discharge valve 22. Above the pipe 21 is a flanged collar 23 which supports a diaphragm 24 and a bonnet 25. A housing 26 extends from the compartment 20 to the wall of the tank above and on each side of the collar 23 and the pipe 21, so that all liquids discharged into the tank except those draining from the chamber 15 must pass under the lower edge of the compartment or said housing, whereby the oil will be discharged in a quiescent state. The diaphragm 24 operates a rock shaft 27, which in turn swings a lever 28. The diaphragm control forms no part of this invention and is fully set forth in the application of E. R. Williams, filed December 5, 1930 under Serial No. 500,303. The lever 28 swings the valve lever 29 by means of a link 30, and when a sufficient quantity of oil is collected in the compartment 20 and the housing 26, the diaphragm will be displaced outwardly thus opening a valve 22. Under ordinary conditions the diaphragm will be partially distended and the valve partly opened during the entire operation of the separator, but is subject to fluctuation as the load varies.

It has been seen that the heavier fluids and liquids will pass downwardly and the oil finally passes into the compartment 20 and housing 26 in a much more quiet state. By virtue of the large size of the opening between the high pressure or inlet chamber and the lower edge of the chamber B, the velocity of the passing or moving oil will be much less, and on account of the particular construction it will be less agitated and turbulent before it discharges from the tank than in other separators where the oil goes directly from inlet to outlet. Also the travel of the oil on the inner wall of the tank will scrub out most of the entrapped or free gas, and gas and gaseous fluids will rise in the tank both from the oil and from the influent into the channel 16. The gaseous fluids passing helically around the channel 16 will be scrubbed against the walls of the tank and the baffle 15. Also a certain amount of scrubbing will be carried out by contact with the conical bottom 17.

Near its upper end the baffle is provided with a plurality of inlet louvres 31, which are connected to the deflectors 32 mounted on the inside of the baffle. As is shown in Figure 2, these deflectors will tend to direct the gaseous fluids circumferentially in the baffle causing them to ride the inner wall thereof, whereby entrapped liquids will be scrubbed out. These liquids will run down to the bottom 17 which will discharge them into the tube 18. The liquids flowing into the tube 18 will be discharged into the compartment 20. It will be appreciated that the tube 18 is large enough so as to permit the liquids to pass downward and gas to pass upward. By this arrangement, the pressures in the chambers A and B will be equalized, and also any gas collected in the chamber B will be free to pass up into the chamber A. This is a very important feature because where there is much of a pressure differential between the chambers A and B, oil would have a tendency to rise into the chamber A, particularly if the pressure were very low therein.

Where the oil collected in the tank is open to the pressure of the gas as it enters the tank, and this gas flows into a chamber which is drained into the oil at the bottom of the tank, it will be seen that the pressure is very likely to be much lower in the chamber than in the tank, and consequently a rise in the oil level will force oil back up through the drain pipe into the chamber. Oil conditions vary, as for instance, hot thin oil will rise higher in a submerged drain pipe than will cold thick oil. Hot light oil will weight much less than heavy thick oil. It has been found that a pressure differential of three pounds will cause hot oil to rise twice as far as cold oil. By the arrangement which has been described, it will be impossible for the oil to rise in the tube 18 and enter the baffle 15. By the time the oil reaches the chamber B it will be so thoroughly scrubbed that substantially all of the gas will be extracted. This oil not being exposed to the incoming gas will not have an opportunity to absorb gas as where it is exposed to such influent. The oil passing out through the pipe 21 being substantially quiescent will carry a minimum amount of gas into the stock tanks, and thus overcome one of the biggest objections to the present system of separation.

A gas discharge pipe 33 extends from the upper portion of the chamber A down through the bottom 17 to a lateral pipe 34 extending through the wall of the tank. It is preferable to make the pipe 33 rectilinear even though it is inclined, rather than to provide it with turns and bends.

Gas will be carried off from the highest point in the separator through the pipes 33 and 34, and its discharge is controlled by a back pressure valve 35 connected to pipe 34. Only sufficient pressure is required in the tank to force the oil through the pipe line to the stock tanks and this may vary according to the size of pipe used. Ordinarily, considerable pressure is carried in separator tanks, particularly where a number of baffles and deflectors are used, such pressure being required to force the gaseous fluids through and around said baffles and deflectors.

It is obvious that any type of control device may be employed and in Figure 5, I have shown a float control instead of the diaphragm control. It is also obvious that a dual control as hereinbefore set forth could be used. In Figure 5, the float chamber 40 is connected at its bottom by a pipe 41 with the tank 10, and at its top by pipe 42 with said tank, both pipes being connected within the housing 26. The float valve is of the usual construction, and has the usual rocking lever 43, which is connected to the valve lever 29 by a link 44. The operation of this device is too well known in the art to require further explanation.

In Figure 6, I have shown another form of the invention which is substantially the same as that shown in Figure 1, except that in place of the elements 17, 18 and 19, the baffle 15 is connected to compartment 20 by an intermediate tubular or cylindrical section 50, which is of substantially the same diameter as the chambers. This makes for economical manufacture. The upper portion A of the section 50 constitutes an upper scrubbing chamber and the lower portion B is an oil collecting chamber. The intermediate portion of the section forms a drain connection from the chamber A to the chamber B and a gas conductor from the chamber B to the chamber A. It is pointed out that the size of the connection between the two chambers is immaterial so long as it accomplishes the function of draining the upper chamber, permitting a free passage of the fluids between the chambers and equalizing the pressures in said chambers. It may be of large diameter as shown in Figure 6, or of smaller diameter as shown in Figure 1. It is not believed necessary to describe the remainder of the parts except that to say the gas discharge pipe 33' is disposed axially of the tank and is connected to a lateral discharge pipe 34'. Also the liquid outlet pipe 21' leads from the bottom 12 instead of from the side of the tank.

In Figures 7 and 8, another form is shown, which is similar to Figure 1, except as to its chamber B and drain pipe. The same gas discharge pipes 33' and 34' are used as in Figure 6. Instead of the cylindrical compartment 20 a semi-circular compartment 20' is secured to one side of the tank and has an inclined top 19'. The compartment 20' incloses the entrance to the pipe 21 as well the entrance to the collar 23. A drain pipe 60 inclines from the bottom 17 to the top of the chamber B. It is obvious that various forms and modifications could be worked out.

It is believed unnecessary to describe the operation as this has been thoroughly brought out with the description of the parts. It may be said, however, that the influent is discharged from the diverter 14, which causes the liquids to take a helical down course and the gaseous fluids to take a helical upward course. The oil travelling circumferentially on the inner surface of the tank wall is thoroughly scrubbed whereby entrapped gas is liberated, and the oil is collected in a quiescent state in the chamber B. All gas which passes upward in the tank and in the tube 18 is collected in the chamber A. The gaseous fluids passing up the channel 16 are scrubbed and are again scrubbed within the baffle 15. All gas is finally discharged into the pipe 33. From the foregoing it will be seen that it is practically impossible for oil to flow with the gas out through the pipe 33, and the gas is given very little opportunity to pass out through the pipe 21 with the oil.

Various changes in the size and shape of the different parts, as well as modifications and alterations, may be made within the scope of the appended claims.

Having illustrated and described preferred forms of the invention, what I claim, is:

1. In an oil and gas separator, an upright tank having a high pressure receiving section for the oil and gas mixture, a low pressure scrubbing chamber in the top of the tank having an inlet from the receiving section, a gas discharge pipe leading from the scrubbing chamber to the exterior of the tank, a low pressure oil collecting chamber at the bottom of the tank having a normally submerged inlet from the receiving section of the tank, a drain connection between the chambers for conducting oil downwardly and gas upwardly from one chamber to the other, and means for carrying off the oil from the collecting chamber.

2. In an oil and gas separator, an upright tank having a receiving section, a continuous hollow column extending from the top to the bottom of the tank, the column having an inlet at its top for gaseous fluids and an inlet at its bottom for oil, the lower end of the column being sealed by the oil in the tank, the receiving section of the tank being exterior of the column, whereby a lower pressure is maintained in the column, the upper portion of the column constituting a scrubbing chamber and the lower portion constituting a collecting chamber, the oil in the collection chamber being substantially free from agitation, the gas pressure in the column being no greater at its bottom than at its top, means for discharging gas from the top of the column to the exterior of the tank, and means for discharging oil from the bottom of the column to the exterior of the tank.

3. In an oil and gas separator, an upright tank having an influent inlet at midheight and a high pressure receiving section intermediate its top and bottom for receiving oil and gas from said inlet and primarily separating the same within said section, the inlet being above the normal oil level in the tank, a low pressure scrubbing chamber at the top of the tank and within the same having an inlet for receiving gaseous fluids from the receiving section, a gas discharge pipe leading from the scrubbing chamber to the exterior of the tank, a low pressure oil collecting chamber at the bottom of the tank and within the same having an inlet below the normal oil level for receiving oil from the receiving section in a quiescent state, an oil outlet from the tank connected with the collecting chamber, and a connection between the scrubbing chamber and the collecting chamber extending through and sealed off from the receiving section, said connection being of ample diameter to permit oil to drain from the scrubbing chamber to the collecting chamber and to permit gas to rise from the collecting chamber to the scrubbing chamber without interference therebetween, whereby the pressures in said chambers are substantially equalized and are lower than the pressure in the receiving section.

4. In an oil and gas separator, an upright tank having an influent inlet at midheight and a high pressure receiving section intermediate its top and bottom for receiving oil and gas from said inlet and primarily separating the same within said section, the inlet being above the normal oil level in the tank, a low pressure scrubbing chamber at the top of the tank and within the same having an inlet for receiving gaseous fluids from the receiving section, a gas discharge pipe leading from the scrubbing chamber to the exterior of the tank, a low pressure oil collecting chamber at the bottom of the tank and within the same having an inlet contiguous to the bottom of the tank for receiving oil from the receiving section in a quiescent state, an oil outlet from the tank connected with the collecting chamber, and a connection between the scrubbing chamber and the collecting chamber extending through and sealed off from the receiving section, said connection being of ample diameter to permit oil to drain from the scrubbing chamber to the collecting chamber and to permit gas to rise from the collecting chamber to the scrubbing chamber without interference therebetween, whereby the pressures in said chambers are substantially equalized and are lower than the pressure in the receiving station.

5. In an oil and gas separator, an upright tank having an influent inlet at midheight and a high pressure receiving section intermediate its top and bottom for receiving oil and gas from said inlet and primarily separating the same within said section, the inlet being above the normal oil level in the tank, a low pressure scrubbing chamber at the top of the tank and within the same having an inlet for receiving gaseous fluids from the receiving section, a gas discharge pipe leading from the scrubbing chamber to the exterior of the tank, a low pressure oil collecting chamber at the bottom of the tank and within the same having an inlet below the normal oil level for receiving oil from the receiving section in a quiescent state, an oil outlet from the tank connected with the collecting chamber above the oil inlet to said chamber, and a connection between the scrubbing chamber and the collecting chamber extending through the receiving section and of ample diameter to permit oil to drain from the scrubbing chamber to the collecting chamber and to permit gas to rise from the collecting chamber to the scrubbing chamber without interference therebetween, whereby the pressures in said chambers are substantially equalized and are lower than the pressure in the receiving section.

6. In an oil and gas separator, an upright tank having a high pressure receiving section intermediate its top and bottom provided with an inlet for receiving an oil and gas mixture and for primarily separating said mixture, a low pressure scrubbing chamber in the top of the tank having an inlet for receiving gaseous fluids from the receiving section, a gas discharge pipe leading from the scrubbing chamber to the exterior of the tank, a low pressure oil collecting chamber at the bottom of the tank having a normally submerged inlet from the receiving section of the tank, a drain pipe extending axially from the scrubbing chamber through the receiving chamber to the top of the collecting chamber of sufficient cross-sectional area to afford a free upward passage for the rising gaseous fluids and a free downward passage for draining liquids, and means for carrying off oil from the collecting chamber.

7. In an oil and gas separator, an upright tank having a high pressure receiving section intermediate its top and bottom provided with an inlet for receiving an oil and gas mixture and for primarily separating said mixture, a low pressure scrubbing chamber in the top of the tank having an inlet for receiving gaseous fluids from the receiving section, a gas discharge pipe leading from the scrubbing chamber to the exterior of the tank, a low pressure oil collecting chamber at the bottom of the tank having a normally submerged inlet from the receiving section of the tank, an inclined drain pipe extending from the bottom of the scrubbing chamber through the receiving section to the top of the collecting chamber of sufficient cross-sectional area to afford a free upward passage for the rising gaseous fluids and a free downward passage for draining liquids, and means for carrying off the oil from the collecting chamber.

JAY P. WALKER.